US 6,574,386 B1

(12) United States Patent
Sufleta

(10) Patent No.: US 6,574,386 B1
(45) Date of Patent: Jun. 3, 2003

(54) DYNAMICALLY RECONFIGURABLE OPTICAL SWITCHING SYSTEM

(75) Inventor: Zbigniew J. Sufleta, San Jose, CA (US)

(73) Assignee: Transparent Networks, Inc., Santa Clara, CA (US)

( * ) Notice: Subject to any disclaimer, the term of this patent is extended or adjusted under 35 U.S.C. 154(b) by 0 days.

(21) Appl. No.: 09/839,848

(22) Filed: Apr. 20, 2001

(51) Int. Cl.[7] .................................................. G02B 6/26
(52) U.S. Cl. .............................. 385/16; 385/15; 385/42; 359/124
(58) Field of Search ............................... 385/15–21, 24, 385/42, 32; 359/115, 124, 118, 127, 128, 139

(56) References Cited

U.S. PATENT DOCUMENTS

| | | | | |
|---|---|---|---|---|
| 5,040,169 A | * | 8/1991 | Guerin et al. ............... | 359/124 |
| 5,524,154 A | * | 6/1996 | Bergland et al. .............. | 385/17 |
| 5,694,499 A | | 12/1997 | Tillerot et al. ................ | 385/24 |
| 6,411,751 B1 | * | 6/2002 | Giles et al. .................... | 385/16 |

OTHER PUBLICATIONS

Bishop, David J. et al., "The Rise of Optical Switching" *Scientific American*, pp. 88–94 (Jan. 2001).
Neukermans, Armand and Ramaswami, Rajiv, "MEMS Technology for Optical Networking Applications" *IEEE Communications Magazine*, pp. 62–69 (Jan. 2001).
"From E–Society to O–Civilization: Transforming Enormous Fiber Capacity Into Intelligent Photonic Connectivity Service" http:/www.transparent networks.com/download/files/10/Eto0_Civilization.pdf pp. 1–17 (Jan. 22, 2001).

* cited by examiner

*Primary Examiner*—Robert H. Kim
*Assistant Examiner*—Therese Barber
(74) *Attorney, Agent, or Firm*—Finnegan, Henderson, Farabow, Garrett & Dunner, L.L.P.

(57) ABSTRACT

A dynamically reconfigurable optical switching system serves as a node on a fiber optic telecommunication network. The optical switching node utilizes an optical switching fabric, a switching device with multiple input ports and multiple output ports that can be controlled to direct a signal from a particular input port to a particular output port. The switching fabric is connected to optical components such as wavelength demultiplexers, wavelength multiplexers, and optical signal conditioners such as amplifiers, wavelength shifters, and signal correctors. The switching fabric is controlled via a switching node controller that includes an electrical connection to a network management infrastructure. The system architecture allows an incoming optical signal to be directed through any desired combination of optical components via multiple traversals of the switching fabric.

20 Claims, 3 Drawing Sheets

DYNAMICALLY RECONFIGURABLE OPTICAL SWITCHING SYSTEM

FIELD OF THE INVENTION

This invention relates generally to switches for optical networks and in particular to dynamically reconfigurable switching systems for optical telecommunications networks.

BACKGROUND

As optical fiber progressively supplements and replaces metal wire as the backbone of telecommunications networks, the switches that route optical signals have emerged as a significant bottleneck. Transmission systems move information as optical photons but the switching systems and so-called crossconnect fabrics that switch, route, multiplex, and demultiplex optical signals have generally been electronic. Electronic switching requires light to be converted to an electronic signal to pass through the switch and then be reconverted to light in a process termed optical-electronic-optical (OEO) conversion that introduces both time delay and cost.

There is great interest in the telecommunications industry, therefore, in developing all optical switching to avoid the necessity of multiple OEO conversions. On long haul networks, ten's or hundred's of individual wavelengths, each carrying a signal, are multiplexed onto each fiber. Switches are desired that provide all optical switching at the fiber level, the wavelength level, or at both levels. As described, for example, by Bishop et al. in *Scientific American* (January, 2001, pp 88–94), all optical switches based on a number of underlying technologies including Micro Electro Mechanical Systems (MEMS) tilting mirrors, thermo-optical devices, bubbles formed by inkjet printing heads, and liquid crystals, have been proposed.

Optical crossconnect systems using these underlying optical switching technologies have been classified by Telcordia Technologies. All of the crossconnect systems have at their core a device, frequently termed a switching fabric, having multiple input ports and multiple output ports. In general, the switching fabric allows a signal from any input port to be coupled to any output port. According to the standard Telcordia definitions, fiber crossconnect (FXC) systems link external connectors directly to specific ports of a switching fabric. Wavelength selective crossconnect (WSXC) systems include, in addition, wavelength demultiplexers and multiplexers. In WSXC systems the input fibers are connected to wavelength demultiplexers. The outputs of the demultiplexers are linked to specific input ports of a switching fabric. Specific output ports of the switching fabric are linked to inputs of wavelength multiplexers and outputs of the multiplexers are linked directly to external output connectors. Wavelength interexchanging crossconnect (WIXC) systems are similar to WSXC systems with the addition of wavelength converters between the output of the switching fabric and the wavelength multiplexers. Finally, the Telcordia classification scheme includes the term hybrid optical crossconnect systems to describe combinations of FXC, WSXC, and WIXC systems.

One example of a WIXC or hybrid system is described in U.S. Pat. No. 5,694,499 to Tillerot et al. which discloses an optical crossconnect system including provisions for demultiplexing multiple signals, optically filtering and wavelength converting the signal, and multiplexing the outgoing signals. However, in the system of Tillerot et al. as well as in the crossconnect systems described by the standard definitions, the optical paths between input signals and output signals are generally rigid, that is the connections between the different optical components are fixed.

Optical switching systems that are not limited to predetermined connections while limiting OEO conversions would further the development of fiber optic telecommunications networks.

SUMMARY

A dynamically reconfigurable optical switching system serves as a node on a fiber optic telecommunication network. The optical switching node according to embodiments of the present invention utilizes an optical switching fabric, a switching device with multiple input ports and multiple output ports that can be controlled to direct a signal from a particular input port to a particular output port.

An input port of at least one demultiplexer is optically connected to an output port of the switching fabric and the multiple output ports of the demultiplexer, for transmitting single-wavelength signals, are each optically connected to an input port of the switching fabric. The multiple input ports of at least one multiplexer, for receiving single wavelength signals, are each optically connected to an output port of the switching fabric and the output port of the multiplexer, for transmitting a multi-wavelength signal, is optically connected to an input port of the switching fabric.

The optical switching node also includes an external fiber connector with connections for receiving a multi-wavelength signal from the network and connections for transmitting a multi-wavelength signal to the network, and a switching node controller. The switching node controller is connected to a management infrastructure of the optical network via a digital electronic connection or a dedicated optical channel. The switching node controller also is connected to provide instructions to the optical switching fabric to direct a signal from a particular input port to a particular output port. The optical switching node may also include optical signal conditioners such as optical amplifiers, wavelength converters, and optical signal correctors that modify optical signals. Output ports of the switching fabric are optically connected to input ports of the optical signal conditioners and output ports of the optical signal conditioners are optically connected to input ports of the switching fabric. The system architecture of the present optical switching node allows an incoming optical signal to be directed through any desired combination of optical components via multiple traversals of the switching fabric.

In other embodiments, the optical switching node includes one or more fixed configuration wavelength demultiplexers having an input port optically connected to the external fiber connector for receiving incoming multi-wavelength signals and multiple output ports directly connected to input ports of the switching fabric. In addition, the optical switching node may include one or more fixed configuration wavelength multiplexers having an output port optically connected to the external fiber connector for transmitting multi-wavelength signals to the network and multiple input ports optically connected to output ports of the switching fabric. Use of the fixed configuration demultiplexers and multiplexers enables signals to be processed with fewer traversals of the switching fabric. According to yet another embodiment, a connector in the external fiber connector for receiving single wavelength signals is optically connected to an input port of the switching fabric and a connector in the external fiber connector for transmitting single wavelength signals is optically connected to an output port of the switching fabric. The single wavelength connectors in the external fiber connector allow the optical switching node to serve as an add/drop multiplexer.

The optical switching node may also include a signal splitter that divides an optical signal into a large amplitude portion and a small amplitude portion and directs the small amplitude portion via the switching fabric to a performance monitoring module. The performance monitoring module is electrically connected to the switching node controller which may send instructions to the fabric controller to control the switching fabric based on the performance information. The optical switching node may also include a signaling access module for separating signaling information embedded in data carried on a single-wavelength of a multi-wavelength signal. The signaling access module is optically connected to the switching fabric and electrically connected to the switching node control.

In some embodiments, the present optical switching node is a configurable optical add/drop multiplexer at a network node of, for example, a ring network. The configurable add/drop multiplexer, based on an optical switching fabric, includes connections for transmitting and receiving multi-wavelength network signals and for transmitting and receiving single-wavelength local add/drop signals. The configurable add/drop multiplexer further includes multiplexers, demultiplexers, and a switching node controller, and may also include one or more optical amplifiers and/or wavelength converters and a performance monitoring module.

Methods of using the optical switching node to process optical signals are also provided.

DETAILED DESCRIPTION

Figure 1:
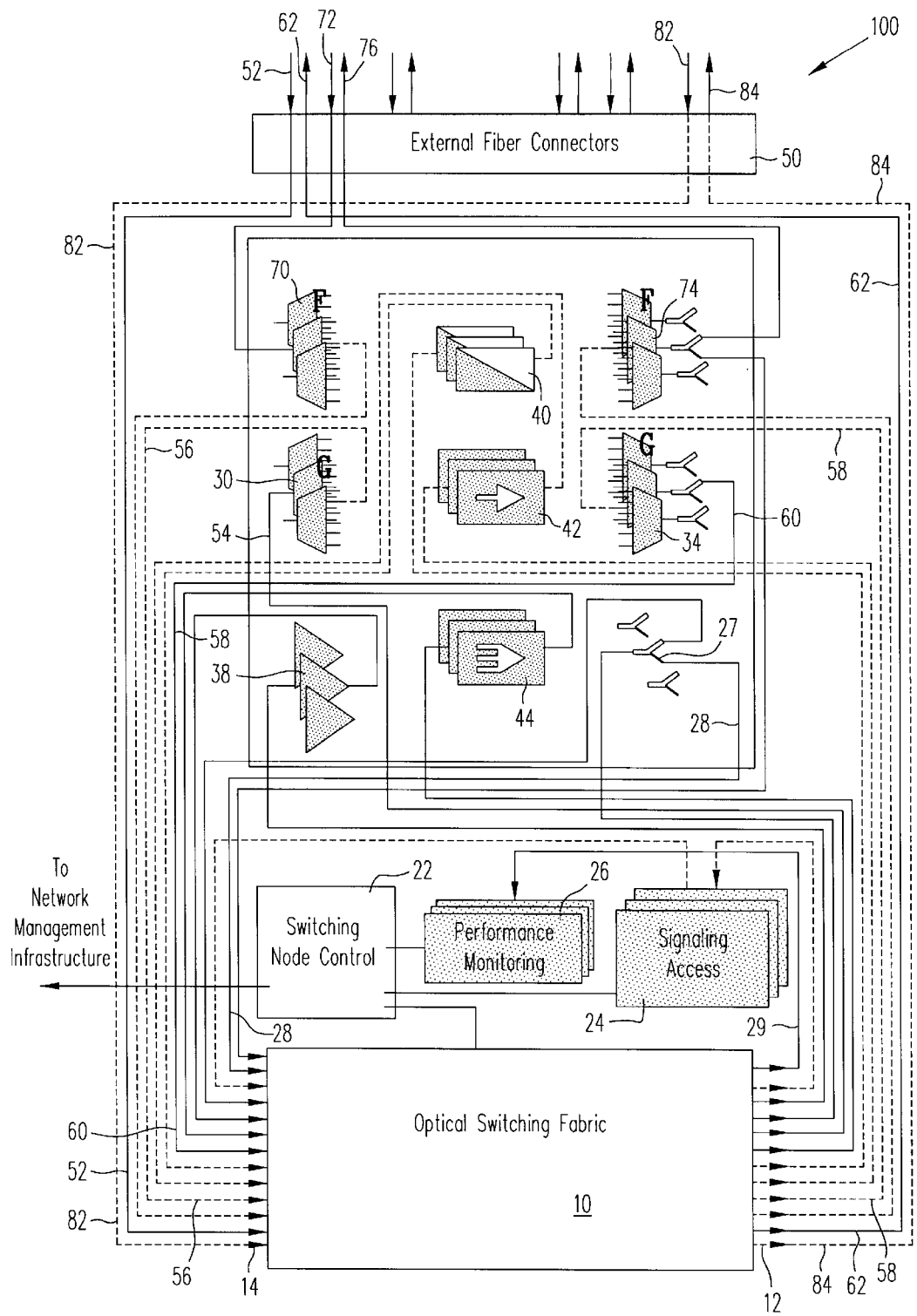
FIG. 1 is a schematic illustration of an optical switching node according to embodiments of the present invention.

An optical switching system according to embodiments of the present invention serves as a node on a fiber optic telecommunication network. Optical switching node (OSN) 100 is illustrated in FIG. 1. The closest classification of OSN 100 within the hierarchy of devices defined by Telcordia is a hybrid optical crossconnect. However, unlike previously described optical crossconnects, OSN 100 is dynamically reconfigurable. OSN 100 functions as a node for peer to peer network communication, providing switching of optical signals and performing other functions such as amplifying and conditioning signals. OSN 100 includes controllers that process control information to route and modify the optical signals. The architecture of OSN 100 allows dynamic creation of intra-system optical paths depending on instantaneous network demands. The architecture also enables time-sharing of optical signal processing components and optical performance monitoring resources.

Key to the design of OSN 100 is an optical switching fabric 10. While the terms optical crossconnect, optical switch, and optical switching fabric have sometimes been used imprecisely and interchangeably, the term optical switching fabric is used here to describe a device with multiple input ports and multiple output ports that enables an optical signal entering the device on an input port to be directed, generally speaking, to any one of the output ports. Preferably, the optical switching fabric is an all optical device in which optical signals are not subjected to optical-electronic-optical (OEO) conversions. Another important feature of optical switching fabric 10 is that insertion loss to the device is low, for example, less than 10 decibels, less than 5 decibels, or less than 3 decibels, depending on the specific application of OSN 100.

As mentioned in the background section, optical switching fabrics based on various technologies are being developed and deployed. A growing number of these switching fabrics consist of two-dimensional or three-dimensional arrays of small tilting mirrors, fabricated with Micro Electro Mechanical Systems (MEMS) technology. In a typical two-dimensional array, the mirrors, organized in an array, flap up and down. When the mirrors are down, light beams pass straight over them; when the mirrors are up, they deflect an incoming beam to a different output port. The three-dimensional arrangement typically involves multiple arrays of mirrors that can be tilted in any direction in order to create free space optical paths. In one design, the arrays are arranged in pairs, facing each other and at an angle of 90 degrees to each other. Incoming light is directed onto a mirror in the first array which deflects it onto a predetermined mirror in the second array. The mirror in the second array, in turn, deflects the light to a predetermined output port. (See, for example, Neukermans and Ramaswami, "MEMS Technology for Optical Networking Applications," *IEEE Communications Magazine* (January, 2001, pp 65–66).) Optical switching fabrics include controllers that receive external instructions and control the switching fabric to direct a signal incoming on a particular port to a particular output port.

The switching fabric 10 is connected to optical components such as one or more wavelength demultiplexers 30 and one or more wavelength multiplexers 34 and, preferably, is also connected to support modules that condition or modify optical signals as discussed further below. The switching node 100 is configured such that output ports 12 of the switching fabric 10 are connected to input ports of the support modules and output ports of the support modules are connected to input ports 14 of the switching fabric 10. Further, fibers carrying incoming signals are connected directly to input ports 14 of the switching fabric and output ports 12 of the switching fabric are connected directly to fibers carrying outgoing signals. Thus, the system architecture of OSN 100 allows an incoming optical signal to be directed through any desired combination of optical components via multiple traversals of the switching fabric.

Fibers carrying signals from an external fiber optic network are joined to OSN 100 via external fiber connector 50. In FIG. 1, multi-wavelength signals are indicated by solid lines and single-wavelength signals are indicated by dotted lines. The number of optical signal paths, optical components, and input and output ports on the optical components and switching fabric shown in FIG. 1 are for illustrative purposes only. External fiber connector 50 has connections for receiving multi-wavelength signals from the network and connections for transmitting multi-wavelength signals to the network. An optical fiber carrying multi-wavelength signal 52 is connected to one of the input ports 14 of the switching fabric 10 via external fiber connector 50. To simplify the discussion, the remainder of FIG. 1 is described in terms of optical signal paths, or, interchangeably optical signals, rather than optical fibers carrying optical signals. It will be understood that optical signals are carried between components on physical optical fibers.

Reference number 54 illustrates a path from one of the output ports 12 of the switching fabric 10 to an input port of a wavelength demultiplexer 30. Wavelength demultiplexer 30 has an input port for receiving a multi-wavelength signal and a plurality of output ports, each output port for transmitting a distinct single-wavelength signal. An exemplary single-wavelength signal 56, output by demultiplexer 30 is connected to an input port 14 of the switching fabric 10. Each output single-wavelength signal emerging from demultiplexer 30 is optically connected to a separate input port 14 on the switching fabric. An exemplary single wavelength signal 58 connected to an output port 12 of the switching fabric 10 is connected to the input of a wavelength multiplexer 34. The multi-wavelength signal 60 output by the multiplexer 34 is connected to an input port 14 of the switching fabric 10. A multi-wavelength signal 62 from an output port 12 of the switching fabric is connected out to the network via external fiber connector 50.

Signals 52 to 62 are sufficient to explain one manner in which optical switching node 100 functions as a network switch. Suppose a signal carried by one wavelength of the multi-wavelength signal 52 is to be separated from the remainder of signal 52 and multiplexed onto a different outgoing multi-wavelength signal 62. Incoming signal 52 is connected to demultiplexer 30 by exiting the switching fabric 10 via multi-wavelength path 54. The single wavelength signal 56, separated by demultiplexer 30, is connected to multiplexer 34 by exiting the switching fabric on single wavelength path 58. In multiplexer 34, signal 58 is combined with other signals to produce multi-wavelength signal 60, which passes through the switching fabric one more time to exit OSN 100 on outgoing multi-wavelength signal 62. The switching function just described involved three passages of the switching fabric.

In some implementations, it may be known, for example, that all incoming signals are to be demultiplexed before being processed within OSN 100 or all outgoing signals are to be multiplexed into multi-wavelength signals before exiting OSN 100. In that case, one passage through the switching fabric can be eliminated by directly connecting incoming multi-wavelength signal 72 to an optional fixed configuration wavelength demultiplexer 70, as shown in FIG. 1. Similarly, OSN 100 optionally also includes fixed configuration wavelength multiplexer 74, the output of which is outgoing multi-wavelength signal 76. Again, the direct connection between the multiplexer and the outgoing channel eliminates one passage through the switching fabric.

External fiber connector 50 may also include a connector for receiving incoming single-wavelength signal 82 and a connector for transmitting outgoing single-wavelength signal 84. Incoming signal 82 is connected to an input port 14 of the switching fabric 10 and one output port 12 of the switching fabric is connected to outgoing signal 84. Using signals 82 and 84, OSN 100 serves as an add/drop multiplexer. An incoming single-wavelength signal 82 may be directed via the switching fabric to a multiplexer 34 or 74, where it is combined with other signals and transmitted out to the network via outgoing multi-wavelength signals 62 or 76. Similarly, a single-wavelength signal separated from an incoming multi-wavelength signal can be directed via the switching fabric to outgoing single-wavelength signal 84.

As currently implemented, telecommunications networks typically use wavelengths in a small range about 1310 nm or about 1550 nm to carry optical signals. The present invention is not limited, however, to any particular wavelengths. Useful optical fibers are, for example, conventional Corning Incorporated (Corning, N.Y.) SMF-28 single mode optical fibers having a core diameter of about 9 microns ($\mu$m) and a cladding diameter of about 125 $\mu$m. Other optical fibers suitable for optical communications applications may alternatively be used.

Multiplexers that combine four, eight, sixteen, tens or hundreds of single-wavelength signals into a multi-wavelength signal and corresponding demultiplexers that separate multi-wavelength signals for Dense Wavelength Division Multiplexing (DWDM) applications have been demonstrated in the laboratory and/or are commercially available. To cite only one example, the DWDM-2F series of multiplexers and demultiplexers provided by Oplink Communications, Inc. (San Jose, Calif.) can be used in the present optical switching node. Demultiplexers and multiplexers with any number of channels can be used in OSN 100 consistent with the requirement that each outgoing channel of the multiplexer is connected to an individual input port 14 of the switching fabric and each incoming channel of the multiplexer is connected to an individual output port 12 of the switching fabric.

Single-wavelength conventionally refers to a narrow range of wavelengths that carries a single signal. The actual wavelength range attributed to a signal depends on the resolution of the optical components. The architecture of OSN 100 is equally applicable to the case in which a multiplexer separates a multi-wavelength signal into multiple waveband signals where each waveband signal include multiple single-wavelength signals. Therefore, single-wavelength signal, as used here, includes single waveband signal. Furthermore, OSN 100 can include multiplexers and demultiplexers of different resolutions, or optical channel widths, and corresponding to different numbers of channels. Therefore, the present optical switching node provides the flexibility to demultiplex signals according to one resolution and multiplex signals in a different way to respond to changing network traffic conditions.

OSN 100 may also include one or more types of optical components collectively termed optical signal conditioners. Optical signal conditioner refers to any component that alters a single-wavelength or multi-wavelength signal or improves optical signal quality. Useful optical signal conditioners include optical amplifiers 38, wavelength converters 40, single wavelength signal correctors 42, and multi-wavelength signal correctors 44, as illustrated in FIG. 1. One or more physical devices of each type of optical signal conditioner may be included. All of the devices are configured with their input side connected to one or more output ports 12 of the optical switching fabric 10 and with their output side connected to one or more input ports 14 of the switching fabric. In this way, any signal can be directed to any optical signal conditioner via the switching fabric, allowing expensive optical signal conditioners to be utilized as shared resources. For example, an incoming multi-wavelength signal 52 may be connected to an optical amplifier 38 or a multi-wavelength signal corrector 44 via the switching fabric 10. The output of the device 38 or 44 goes back through the switching fabric, which enables it to be directed as desired.

Optical amplifiers 38 are used to increase the amplitude of optical signals for transmission over long haul networks. Typical optical amplifiers are erbium ion doped fiber or planar devices. Commercial optical amplifiers useful in the present invention include the OAC series modules provided by JDS Uniphase (San Jose, Calif.) Present commercial wavelength converters 40 typically alter the wavelength of a single-wavelength signal. Again, citing only one example, the BL-7270 Series fiber optic wavelength converters provided by Red Hawk/CDT (Milpitas, Calif.) are suitable for the present application. Wavelength converters that shift the wavelength of an entire band of wavelengths by the same amount, by a process known as four-wave mixing, are under development. OSN 100 may optionally include wavelength converters that operate on a multi-wavelength signal.

Typical single-wavelength signal correctors 42 or multi-wavelength signal correctors 44 are currently optical-electronic-optical (OEO) devices, known in the industry as 2R regenerators, providing reshaping and regenerating of signals, or 3R regenerators, which provide, in addition retiming of signals. As optical signals propagate through a network the signal quality can degrade in various ways including loss of amplitude, increased dispersion, and developing jitter. Generally speaking, the signal correctors eliminate noise from the signals and restore the signals to their original form. One example of a commercially available signal corrector is the Yafo10 PMD Compensator, manufactured by Yafo Networks (Hanover, Md.)

In addition, OSN 100 may include signal splitters 27 that redirect a small portion of an optical signal for the purpose of performance monitoring. The splitters may divide a signal in an amplitude ratio of, for example, 95:5 or 99:1, with the small amplitude portion 28 directed to the switching fabric. The large amplitude portion is also directed to an input port of the switching fabric. An output port of the switching fabric is connected to a performance monitoring module 26 by path 29 to enable the small amplitude portion of the signal to access the performance monitoring module. Signals may be monitored, for example, for power distribution among wavelength channels and for optical signal to noise ratio. Useful optical channel monitors include the AXSUN™ optical channel monitor manufactured by Axsun Technologies (Billerica, Mass.) Monitors that evaluate optical bit error rate without injecting patterns into optical traffic are also useful as part of performance monitoring module 26. In some embodiments, a beam splitter is positioned after every multiplexer to monitor the extent of mixing in the multiplexer. The present architecture, based on the optical switching fabric, limits the number of expensive monitoring devices needed in OSN 100.

OSN 100 also includes a switching node control device 22, which serves as a link between OSN 100 and the external network management infrastructure. Switching node control device 22 communicates with the network management infrastructure via a digital electronic connection, such as an Ethernet connection, or via a dedicated optical channel, separate from the multi-wavelength or single-wavelength optical signal channels. Device 22 translates network routing instructions into instructions to the optical switching fabric 10 to direct a signal from a particular input port to a particular output port. Switching node control 22 also receives information from performance monitoring modules 26 via a digital electronic or separate optical connection and processes the performance information to send feedback to network management infrastructure. Switching node control 22 is an electronic device combining hardware and software, based on commercially available CPU boards, operating systems, and software implementing standards-based communication protocols, as known to those skilled in the art of communications systems.

The architecture of OSN 100 allows the switching node to receive signaling information from peer nodes on the network and to transmit signaling information to peer nodes in three ways. First, signaling can use a network completely separate from the optical network, such as the network management infrastructure which communicates with network nodes over a digital electronic connection or separate dedicated optical channel. Second, a single wavelength can be dedicated for signaling purposes. The single-wavelength signal would be connected to an optical-electrical device (not shown) which converts the signal to a digital signal and transmits it over a digital electronic connection to switching node control 22. Switching node control device 22 transmits signaling messages to peer nodes in an analogous manner by sending a digital signal to the optical-electrical device which converts it to an outgoing optical signal on the dedicated signaling wavelength.

The third and most complicated signaling method enabled by OSN 100 is termed in-band signaling, in which signaling information is embedded in the data carried on one wavelength of a multi-wavelength signal. In-band signaling may be based, for example, on the standard SONET protocol or on alternative protocols used for communication purposes. For in-band signaling, an incoming multi-wavelength signal is directed to a demultiplexer, either by direct connection to a fixed configuration demultiplexer 70, or via the optical switching fabric to a demultiplexer 30. The one wavelength that contains signaling information is directed by the switching fabric, over path 28 to a signaling access module 26. The signaling access module, which is connected by a digital electronic channel to the switching node control 22, is an optical-electrical device that separates data and signaling information from incoming signals and injects signaling information into outgoing data signals. Signaling access module 26 converts incoming optical signals to digital form to separate the signaling information and regenerates the optical data for transmission to the peer node indicated by the signaling information. Signaling information is exchanged over the digital electronic or separate optical channel between the signaling access module 26 and the switching node control 22. An outgoing signal carrying data and signaling information, exits signaling access module 26 on path 29 which is connected to an input port of the switching fabric. The switching fabric directs the outgoing single-wavelength channel carrying the signaling information to a multiplexer where it is combined with other wavelengths before being directed out of the switching node on an outgoing multi-wavelength signal.

Figure 2:
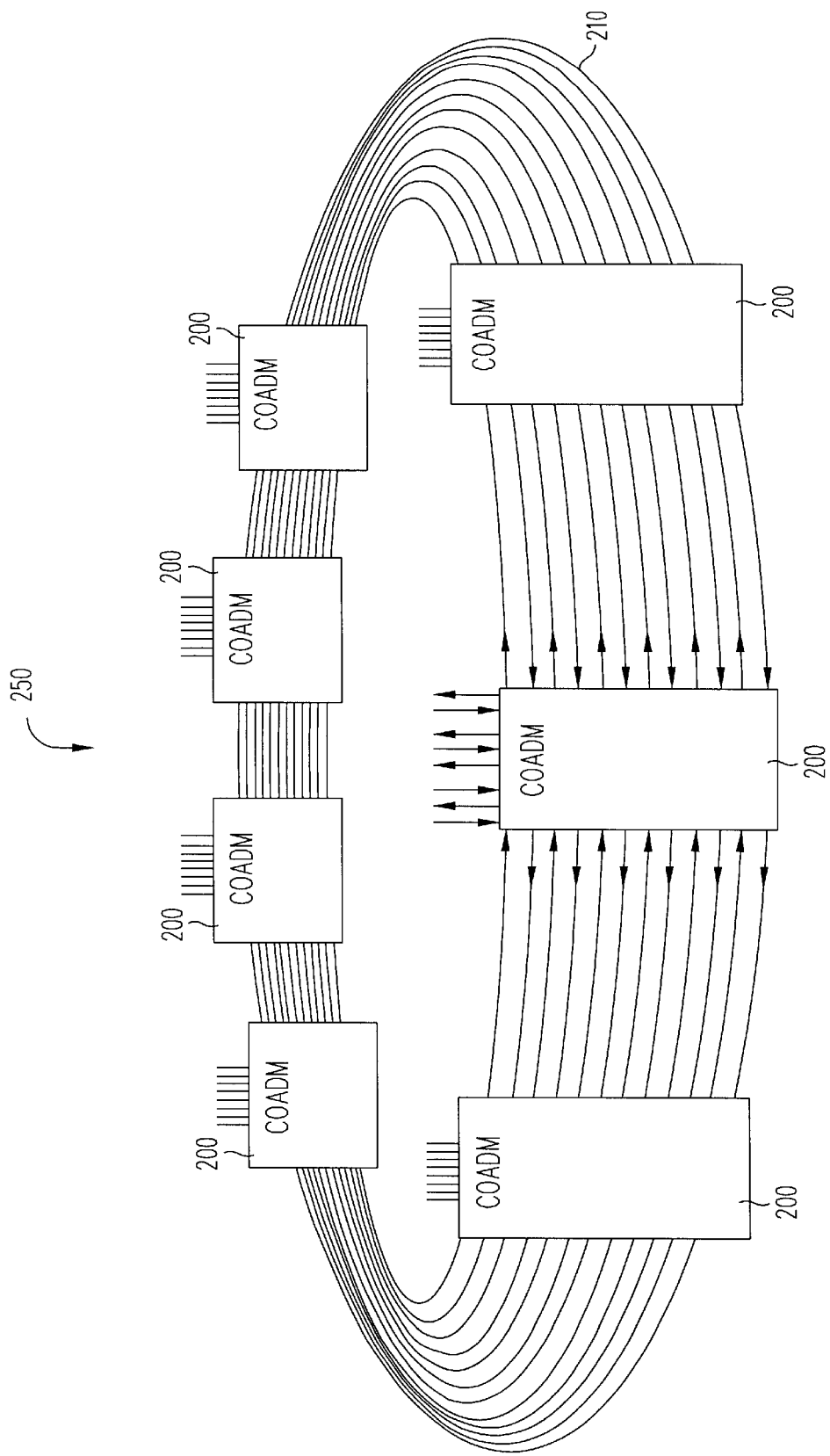
FIG. 2 is a schematic illustration of a ring network including a configurable optical add/drop multiplexers (COADM), which is an embodiment of an optical switching node according to the present invention, at each network node.
Figure 3:
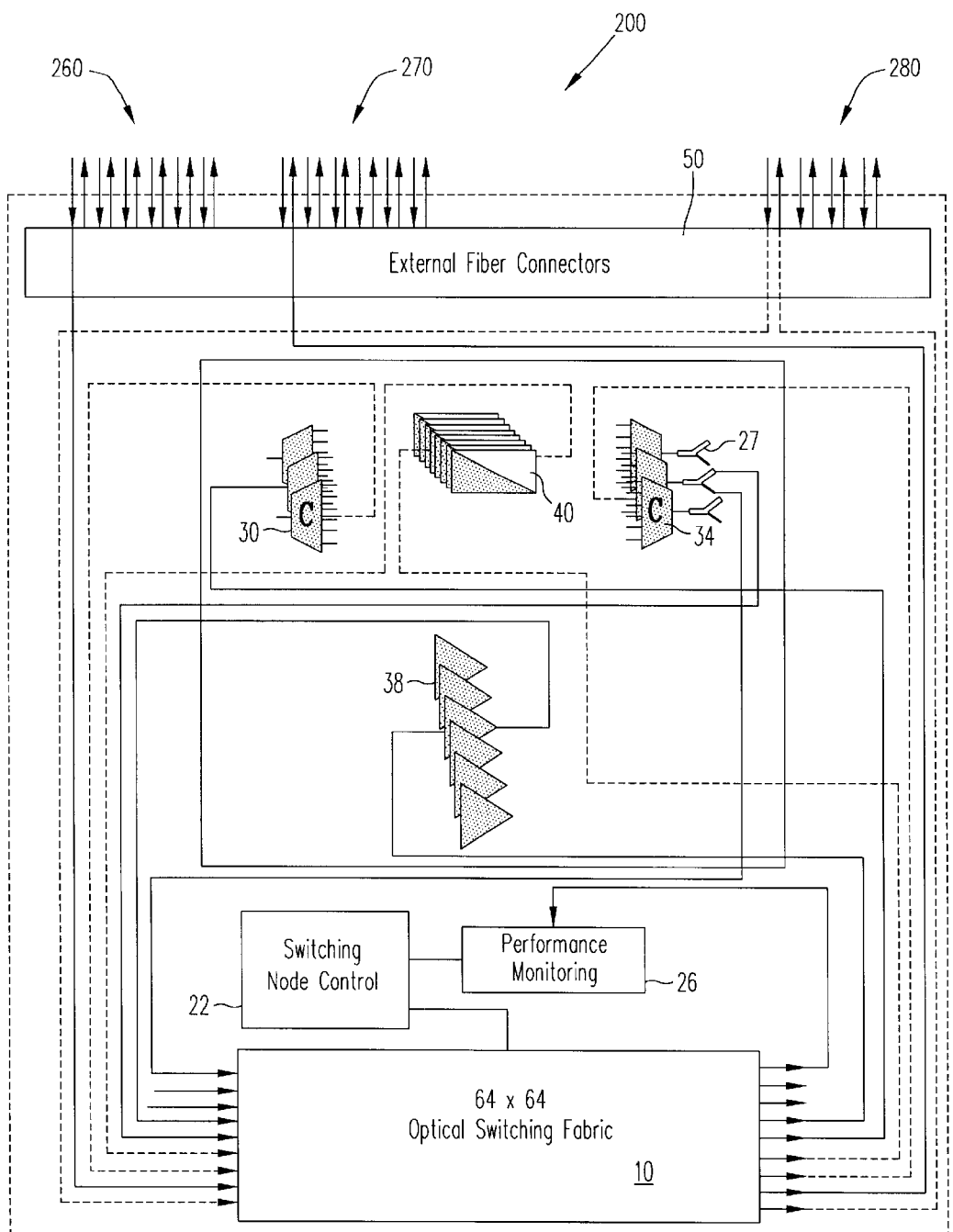
FIG. 3 is a schematic illustration of a COADM included in FIG. 2.

One specific example of the use of the present configurable optical switching node is illustrated in FIG. 2. FIG. 2 depicts a ring network 250 with a configurable optical add/drop multiplexer (COADM) 200 at each network node. COADM 200 is a particular implementation of optical switching node 100, as shown in detail in FIG. 3. The function of each COADM 200, is to drop wavelength signals destined for a given node and add wavelength signals originating from a given node. COADM 200 can be configured to demultiplex or multiplex only those multi-wavelength signals that carry the particular wavelength to be added or dropped.

The example ring of FIG. 2 includes twelve fibers 210, each of which carries eight wavelengths. In accordance with common, practice, six fibers carry signals around the ring in a clockwise direction and six fibers carry signals around the ring in a counterclockwise direction. In the present example, COADM 200 includes switching node control device 22, performance monitoring module 26, three demultiplexers 30, three multiplexers 34, three signal splitters 27, six optical amplifiers 38, which amplify multi-wavelength signals, and twelve wavelength converters 40, which operate on single-wavelength signals. The connections between the optical components and the switching fabric are as described above with respect to OSN 100. COADM 200 additionally includes twelve ports 260, on external fiber connector 50, for receiving incoming signals from, or transmitting outgoing signals to, ring fibers connected to one side of COADM 200 and 12 ports 270 for receiving signals from, or sending signals to, ring fibers connected to the other side of COADM 200. Four incoming and four outgoing single-wavelength local add/drop ports 280 are also included on external fiber connector 50.

In this example, COADM 200 is based on an optical switching fabric 10 with 64 input ports and 64 output ports. An exemplary allocation of the input and output ports of the optical switching fabric 10, which enables COADM 200 to be dynamically configured to send incoming or outgoing signals through any of the optical components listed above, is provided below in the Table.

TABLE

Allocation of Switching Fabric Input and Output Ports in COADM 200

| Input Ports | | Output Ports | |
|---|---|---|---|
| Number of Ports | Component | Number of Ports | Component |
| 12 | Multi-wavelength input fiber (connected to ports 260 and 270) | 12 | Multi-wavelength output fiber (connected to ports 260 and 270) |
| 24 | Single-wavelength output from 3 demultiplexers 30 | 24 | Single-wavelength input to 3 multiplexers 34 |
| 3 | Multi-wavelength output from 3 multiplexers 34 | 3 | Multi-wavelength input to 3 demultiplexers 30 |
| 4 | Local add/drop fibers (connected to port 280) | 4 | Local add/drop fibers (connected to port 280) |
| 6 | Multi-wavelength output from 6 amplifiers 38 | 6 | Multi-wavelength input to 6 amplifiers 38 |
| 3 | Output from 3 signal splitters 27 | 1 | Input to performance monitoring module 26 |
| 12 | Output from 12 wavelength converters 40 | 12 | Input to 12 wavelength converters 40 |

Optical switching fabrics suitable for use in COADM 200 are provided commercially by Optical Micro Machines (OMM) (San Diego, Calif.), Onix Microsystems (Richmond, Calif.), Sorrento Networks (San Diego, Calif.), and Agere Systems, a Lucent Technologies company, (Allentown, Pa.) In addition, a switching fabric with 256 input and output ports, is described by Calient Networks (San Jose, Calif.) under the product name DiamondWave. Switching fabrics with on the order of a thousand input ports and a thousand output ports have been projected in the technical press.

COADM 200 uses out-of-band signaling to add or drop signals. For example, to remove (drop) a signal from a ring fiber and direct it to a destination local to COADM 200, an incoming multi-wavelength signal entering COADM 200 via port 260 or 270 is connected via the switching fabric 10 to a demultiplexer 30. The single-wavelength output signal of demultiplexer 30 that is to be dropped is directed via the switching fabric to an outgoing single-wavelength local add/drop port 280. To add a local signal to a ring fiber having available capacity at the wavelength of the local signal, an incoming signal from, for example port 260, is directed to a demultiplexer 30 via the switching fabric. The local signal to be added enters COADM via an incoming local add/drop port 280 and is directed via the switching fabric, to a multiplexer 34, to be combined with the demultiplexed ring fiber signal and directed back to the ring via an outgoing port 270. COADM 200 also can perform amplification, wavelength conversion, and optical performance monitoring of select signals by directing the signals through the optical amplifiers 38, wavelength converters 40, and the performance monitoring module 26, via the switching fabric.

The network ring illustrated schematically in FIG. 2 can be the ring of a local access network, a metro ring, or the ring of a core, alternatively termed a long-haul, network. The COADM at each network node does not have to be identical. The add/drop multiplexers may include different optical components at different nodes. The allocation of input and output ports on the optical switching fabric 10 as listed in the Table is exemplary only. The actual use of fabric ports may vary from one implementation of COADM 200 to another. Although a ring network architecture was presented for illustrative purposes in FIG. 2, optical switching nodes of the general architecture of OSN 100 may alternatively be used as nodes of a mesh network architecture.

Thus, it may be seen that optical switching nodes according to embodiments of the present invention can be dynamically reconfigured to modify and redirect optical signals as changing network circumstances require. The present switching node architecture enables optical components to be used as a programmable device. If an optical path through a switching node based on an all optical switching fabric includes only optical devices such as optical amplifiers and multiplexers, then the present switching node is a purely optical device. Furthermore, the modular design of the switching system allows individual components to be replaced as technology evolves.

Although the invention has been described with referee to particular optical components and signal paths, the description is only an example of the invention's application and should not be taken as a limitation. For example, implementation of the present system architecture with switching fabrics with much larger numbers of input and output ports than the example provided here is presently contemplated. Various adaptations and combinations of features disclosed are within the scope of the invention as defined by the following claims.

I claim:

1. An optical switching system for use on an optical network, the switching system comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for recieving a multi-wavelength signal from the network and an outgoing multi-wavelength connector for transmitting a multi-wavelength signal to the network;

an optical connection between the incoming multi-wavelength connector and an input port of the switching fabric and an optical connection between an output port of the switching fabric and the outgoing multi-wavelength connector;

a switching node controller connected to a management infrastructure of the optical network and connected to the switching fabric to provide instructions to control the switching fabric; and further comprising an optical signal conditioner wherein an input port of the optical signal conditioner is optically connected to an output port of the switching fabric and wherein an output port of the optical signal conditioner is optically connected to an input port of the switching fabric.

2. The optical switching system of claim 1 further comprising:

an optical demultiplexer having an input port for receiving a multi-wavelength optical signal and a plurality of output ports, each output port for transmitting a single wavelength signal at a distinct wavelength, wherein the input port of the demultiplexer is optically connected to the external fiber connector and wherein each output port of the demultiplexer is optically connected to an input port of the switching fabric; and an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to the external fiber connector.

3. The optical switching system of claim 1 wherein the external fiber connector further comprises an incoming single-wavelength connector for receiving a single-wavelength signal and an outgoing single-wavelength connector for transmitting a single-wavelength signal and wherein the optical switching system further comprises an optical connection between an input port of the switching fabric and the incoming single-wavelength connector and an optical connection between an output port of the switching fabric and the outgoing single-wavelength connector.

4. The optical switching system of claim 1 wherein the optical signal conditioner is an optical amplifier.

5. The optical switching system of claim 1 wherein the optical signal conditioner is a wavelength converter.

6. The optical switching system of claim 1 wherein the optical signal conditioner is a signal corrector that improves the optical quality of a single-wavelength signal.

7. The optical switching system of claim 1 wherein the optical signal conditioner is a signal corrector that improves the optical quality of a multi-wavelength signal.

8. An optical switching system for use on an optical network, the switching system comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network and an outgoing multi-wavelength connector for transmitting a multi-wavelength signal to the network;

an optical connection between the incoming multi-wavelength connector and an input port of the switching fabric and an optical connection between an output port of the switching fabric and the outgoing multi-wavelength connector;

a switching node controller connected to a management infrastructure of the optical network and connected to the switching fabric to provide instructions to control the switching fabric; and further comprising a signal splitter that divides an optical signal into a large amplitude portion and a small amplitude portion and wherein an input port of the signal splitter is optically connected to an output port of the switching fabric, and wherein the large amplitude portion and the small amplitude portion are each optically connected to a different input port of the switching fabric.

9. An optical switching system for use on an optical network, the switching system comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network and an outgoing multi-wavelength connector for transmitting a multi-wavelength signal to the network;

an optical connection between the incoming multi-wavelength connector and an input port of the switching fabric and an optical connection between an output port of the switching fabric and the outgoing multi-wavelength connector;

a switching node controller connected to a management infrastructure of the optical network and connected to the switching fabric to provide instructions to control the switching fabric; and further comprising a signal splitter that divides an optical signal into a large amplitude portion and a small amplitude portion and wherein an input port of the signal splitter is optically connected to the output port of the multiplexer and wherein the large amplitude portion and the small amplitude portion are each optically connected to a different input port of the switching fabric.

10. An optical switching system for use on an optical network, the switching system comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network and an outgoing multi-wavelength connector for transmitting a multi-wavelength signal to the network;

an optical connection between the incoming multi-wavelength connector and an input port of the switching fabric and an optical connection between an output port of the switching fabric and the outgoing multi-wavelength connector;

a switching node controller connected to a management infrastructure of the optical network and connected to the switching fabric to provide instructions to control the switching fabric; and further comprising a performance monitoring device having an input port optically connected to an output port of the switching fabric and having a connection to the switching node controller.

11. An optical switching system for use on an optical network, the switching system comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network and an outgoing multi-wavelength connector for transmitting a multi-wavelength signal to the network;

an optical connection between the incoming multi-wavelength connector and an input port of the switching fabric and an optical connection between an output port of the switching fabric and the outgoing multi-wavelength connector;

a switching node controller connected to a management infrastructure of the optical network and connected to the switching fabric to provide instructions to control the switching fabric; and further comprising a signaling access module for separating signaling information from data carried by an optical signal wherein an input port of the signaling access module is optically connected to an output port of the switching fabric and an output port of the signaling access module is optically connected to an input port of the switching fabric and wherein the signaling access module is electrically connected to the switching node controller.

12. A configurable optical add/drop multiplexer for use at a node of an optical network, the add/drop multiplexer comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network, an outgoing multi-wavelength connector for transmitting a multi-wavelength signal to the network, an incoming single-wavelength connector for receiving a local single-wavelength signal, and an outgoing single-wavelength connector for transmitting a local single-wavelength signal;

an optical connection between the incoming multi-wavelength connector and an input port of the switching fabric, an optical connection between an output port of the switching fabric and the outgoing multi-wavelength connector, an optical connection between the incoming single-wavelength connector and an input port of the switching fabric, and an optical connection between an output port of the switching fabric and the outgoing single-wavelength connector;

a switching node controller connected to a management infrastructure of the optical network and connected to the switching fabric to provide instructions to control the switching fabric; and further comprising an optical signal conditioner wherein an input port of the optical signal conditioner is optically connected to an output port of the switching fabric and wherein an output port of the optical signal conditioner is optically connected to an input port of the switching fabric.

13. The add/drop multiplexer of claim 12 wherein the optical signal conditioner is an optical amplifier.

14. The add/drop multiplexer of claim 12 wherein the optical signal conditioner is a wavelength converter.

15. A configurable optical add/drop multiplexer for use at a node of an optical network, the add/drop multiplexer comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network, an outgoing multi-wavelength connector for transmitting a multi-wavelength signal to the network, an incoming single-wavelength connector for receiving a local single-wavelength signal, and an outgoing single-wavelength connector for transmitting a local single-wavelength signal;

an optical connection between the incoming multi-wavelength connector and an input port of the switching fabric, an optical connection between an output port of the switching fabric and the outgoing multi-wavelength connector, an optical connection between the incoming single-wavelength connector and an input port of the switching fabric, and an optical connection between an output port of the switching fabric and the outgoing single-wavelength connector;

a switching node controller connected to a management infrastructure of the optical network and connected to the switching fabric to provide instructions to control the switching fabric; and further comprising a signal splitter that divides an optical signal into a large amplitude portion and a small amplitude portion and wherein an input port of the signal splitter is optically connected to the output port of the multiplexer and wherein the large amplitude portion and the small amplitude portion are each optically connected to a different input port of the switching fabric.

16. A configurable optical add/drop multiplexer for use at a node of an optical network, the add/drop multiplexer comprising:

an optical switching fabric having a plurality of input ports and a plurality of output ports wherein the switching fabric is controllable to direct an optical signal from an input port to an output port, wherein the input port is any one of the plurality of input ports and the output port is any one of the plurality of output ports;

an optical demultiplexer having an input port for receiving a multi-wavelength optical signal and a plurality of output ports, each output port for transmitting a distinct single wavelength signal, wherein the input port of the demultiplexer is optically connected to an output port of the switching fabric and wherein each output port of the demultiplexer is optically connected to an input port of the switching fabric;

an optical multiplexer having a plurality of input ports, each input port receiving a single-wavelength signal of a distinct frequency, and an output port for transmitting a multi-wavelength signal, wherein each input port is optically connected to an output port of the switching fabric and the output port of the multiplexer is optically connected to an input port of the switching fabric;

an external fiber connector comprising an incoming multi-wavelength connector for receiving a multi-wavelength signal from the network, an outgoing multi-wavelength connector for transmitting a multi-wavelength signal to the network, an incoming single-wavelength connector for receiving a local single-wavelength signal, and an outgoing single-wavelength connector for transmitting a local single-wavelength signal;

an optical connection between the incoming multi-wavelength connector and an input port of the switching fabric, an optical connection between an output port of the switching fabric and the outgoing multi-wavelength connector, an optical connection between the incoming single-wavelength connector and an input port of the switching fabric, and an optical connection between an output port of the switching fabric and the outgoing single-wavelength connector;

a switching node controller connected to a management infrastructure of the optical network and connected to the switching fabric to provide instructions to control the switching fabric; and further comprising a performance monitoring device having an input port optically connected to an output port of the switching fabric and having a connection to the switching node controller.

17. A method of processing optical signals at an optical network node, the method comprising:

receiving a multi-wavelength optical signal at an input port of an optical switching fabric, the switching fabric having a plurality of input ports and a plurality of output ports and wherein the switching fabric is controllable to direct an optical signal from an input port to an output port, wherein the input port is any one of the plurality of input ports and the output port is any one of the plurality of output ports;

controlling the switching fabric to direct the multi-wavelength signal to an output port of the switching fabric connected to an input port of an optical demultiplexer;

receiving a plurality of single-wavelength optical signals transmitted from output ports of the optical demultiplexer at a plurality of input ports of the switching fabric wherein each single-wavelength signal is received at a separate input port of the switching fabric;

controlling the switching fabric to direct the plurality of single-wavelength signals to a plurality of output ports of the switching fabric that are optically connected to a plurality of input ports of an optical multiplexer;

receiving a multi-wavelength signal transmitted from an output port of the demultiplexer at an input port of the switching fabric;

controlling the switching fabric to direct the multi-wavelength signal to an output port of the switching fabric optically connected with an external connection to the network; and further comprising, after receiving the plurality of single-wavelength optical signals transmitted from output ports of the optical demultiplexer:
  controlling the switching fabric to direct at least one single-wavelength signal to an output port of the switching fabric that is optically connected to an input port of an optical signal conditioner; and
  receiving a single-wavelength signal transmitted from the output port of the optical signal conditioner at an input port of the switching fabric.

18. The method of claim 17 wherein the optical signal conditioner is a wavelength converter or a single-wavelength signal corrector.

19. A method of processing optical signals at an optical network node, the method comprising:

receiving a multi-wavelength optical signal at an input port of an optical switching fabric, the switching fabric having a plurality of input ports and a plurality of output ports and wherein the switching fabric is controllable to direct an optical signal from an input port to an output port, wherein the input port is any one of the plurality of input ports and the output port is any one of the plurality of output ports;

controlling the switching fabric to direct the multi-wavelength signal to an output port of the switching fabric connected to an input port of an optical demultiplexer;

receiving a plurality of single-wavelength optical signals transmitted from output ports of the optical demultiplexer at a plurality of input ports of the switching fabric wherein each single-wavelength signal is received at a separate input port of the switching fabric;

controlling the switching fabric to direct the plurality of single-wavelength signals to a plurality of output ports of the switching fabric that are optically connected to a plurality of input ports of an optical multiplexer;

receiving a multi-wavelength signal transmitted from an output port of the demultiplexer at an input port of the switching fabric;

controlling the switching fabric to direct the multi-wavelength signal to an output port of the switching fabric optically connected with an external connection to the network; and further comprising, after receiving a multi-wavelength optical signal at an input port of an optical switching fabric,
  controlling the switching fabric to direct the multi-wavelength signal to an output port of the switching fabric connected to an input port of an optical amplifier; and
  receiving a multi-wavelength signal transmitted from an output port of the optical amplifier at an input port of the switching fabric.

20. A method of processing optical signals at an optical network node, the method comprising:

receiving a multi-wavelength optical signal at an input port of an optical switching fabric, the switching fabric having a plurality of input ports and a plurality of output ports and wherein the switching fabric is controllable to direct an optical signal from an input port to an output port, wherein the input port is any one of the plurality of input ports and the output port is any one of the plurality of output ports;

controlling the switching fabric to direct the multi-wavelength signal to an output port of the switching fabric connected to an input port of an optical demultiplexer;

receiving a plurality of single-wavelength optical signals transmitted from output ports of the optical demultiplexer at a plurality of input ports of the switching fabric wherein each single-wavelength signal is received at a separate input port of the switching fabric;

controlling the switching fabric to direct the plurality of single-wavelength signals to a plurality of output ports of the switching fabric that are optically connected to a plurality of input ports of an optical multiplexer;

receiving a multi-wavelength signal transmitted from an output port of the demultiplexer at an input port of the switching fabric;

controlling the switching fabric to direct the multi-wavelength signal to an output port of the switching fabric optically connected with an external connection to the network; and controlling the switching fabric to direct a single-wavelength signal comprising signaling information and data to an output port of the switching fabric optically connected to a signaling access module;

extracting the signaling information in the signaling access module; and using the signaling information to control the switching fabric.

* * * * *